(12) United States Patent
Tomita et al.

(10) Patent No.: US 6,908,120 B2
(45) Date of Patent: Jun. 21, 2005

(54) TUBE JOINT

(75) Inventors: Taku Tomita, Katsushika-ku (JP); Yoshimoto Taneya, Koshigaya (JP); Motohiro Sato, Toride (JP); Keiichiro Naito, Hiratsuka (JP); Hitoshi Hamasaki, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/838,262

(22) Filed: May 5, 2004

(65) Prior Publication Data

US 2004/0232697 A1 Nov. 25, 2004

(30) Foreign Application Priority Data

May 23, 2003 (JP) ........................................ 2003-146922

(51) Int. Cl.[7] .................................................. F16L 37/16
(52) U.S. Cl. ...................... 285/306; 285/313; 285/322; 285/340; 285/308
(58) Field of Search ................................ 285/306, 313, 285/319, 340, 308, 321, 323

(56) References Cited

U.S. PATENT DOCUMENTS

| | | | |
|---|---|---|---|
| 5,029,908 A | * | 7/1991 | Belisaire ..................... 285/323 |
| 5,160,179 A | | 11/1992 | Takagi |
| 5,722,696 A | * | 3/1998 | Taneya ........................ 285/322 |
| 5,762,380 A | * | 6/1998 | Hiwatashi et al. .......... 285/322 |
| 6,447,019 B1 | * | 9/2002 | Hosono et al. ............. 285/323 |
| 6,578,879 B2 | | 6/2003 | Muto .......................... 285/322 |
| 6,764,102 B2 | * | 7/2004 | Ezura .......................... 285/322 |

FOREIGN PATENT DOCUMENTS

| | | |
|---|---|---|
| EP | 0 957 306 | 11/1999 |
| JP | 11-325362 | 11/1999 |

* cited by examiner

Primary Examiner—David Bochna
(74) Attorney, Agent, or Firm—Paul A. Guss

(57) ABSTRACT

A tube joint includes a body into which a tube is inserted, a guide member which is arranged in the body, a chuck which engages with the outer circumferential surface of the tube to retain the tube, fastening pawls which protrude while being inclined by predetermined angles toward the inner circumference facing the tube on the chuck, a release bush which releases the tube from a fastened state, and a packing which is installed in the body. The packing surrounds the outer circumferential surface of the tube, and is displaceable in the axial direction of the body when a pressure fluid is supplied.

13 Claims, 7 Drawing Sheets

US 6,908,120 B2

TUBE JOINT

BACKGROUND OF THE INVENTION

1. Field of the Invention

The present invention relates to a tube joint for connecting a pressure fluid tube in order to introduce and discharge a pressure fluid.

2. Description of the Related Art

The present applicant has proposed a tube joint for connecting a pressure fluid tube to a fluid pressure-operated apparatus such as a cylinder (see, for example, Japanese Laid-Open Patent Publication No. 11-325362).

The tube joint includes a body made of resin into which the pressure fluid tube is inserted. The body is provided with a chuck having fastening pawls which protrude by predetermined lengths inwardly in the radial direction. The pressure fluid tube is inserted into the body, and then the pressure fluid tube is slightly pulled in a direction opposite to the direction of insertion. Accordingly, the chuck is displaced along a guide member together with a collet which is provided on the outer circumference thereof.

Accordingly, the collect is diametrally shrunk inwardly in the radial direction to press the ends of the fastening pawls inwardly in the radial direction. The fastening pawls bite into the outer circumferential surface of the pressure fluid tube to prevent the pressure fluid tube from being disengaged from the body. The fastening pawls are retained by the guide member which is installed in the body.

A release member, which is used to disengage the pressure fluid tube having been retained by the chuck, is inserted into the guide member. The release member is provided with an engaging step for preventing the release member from being disengaged from the guide member. Further, a plurality of slits are formed circumferentially at the end of the release member. When the end of the release member is diametrally shrunk a little inwardly in the radial direction by the slits, the release member is inserted while the end is not caught by the engaging step which protrudes in the inner circumferential direction, when the release member is installed into the guide member.

In order to improve the assembling operability for the tube joint, it is demanded for the tube joint concerning Japanese Laid-Open Patent Publication No. 11-325362 to reduce the number of parts, simplify the production steps for the tube joint, and improve the productivity.

SUMMARY OF THE INVENTION

A general object of the present invention is to provide a tube joint which makes it possible to simplify the production steps and improve the productivity by reducing the number of parts.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
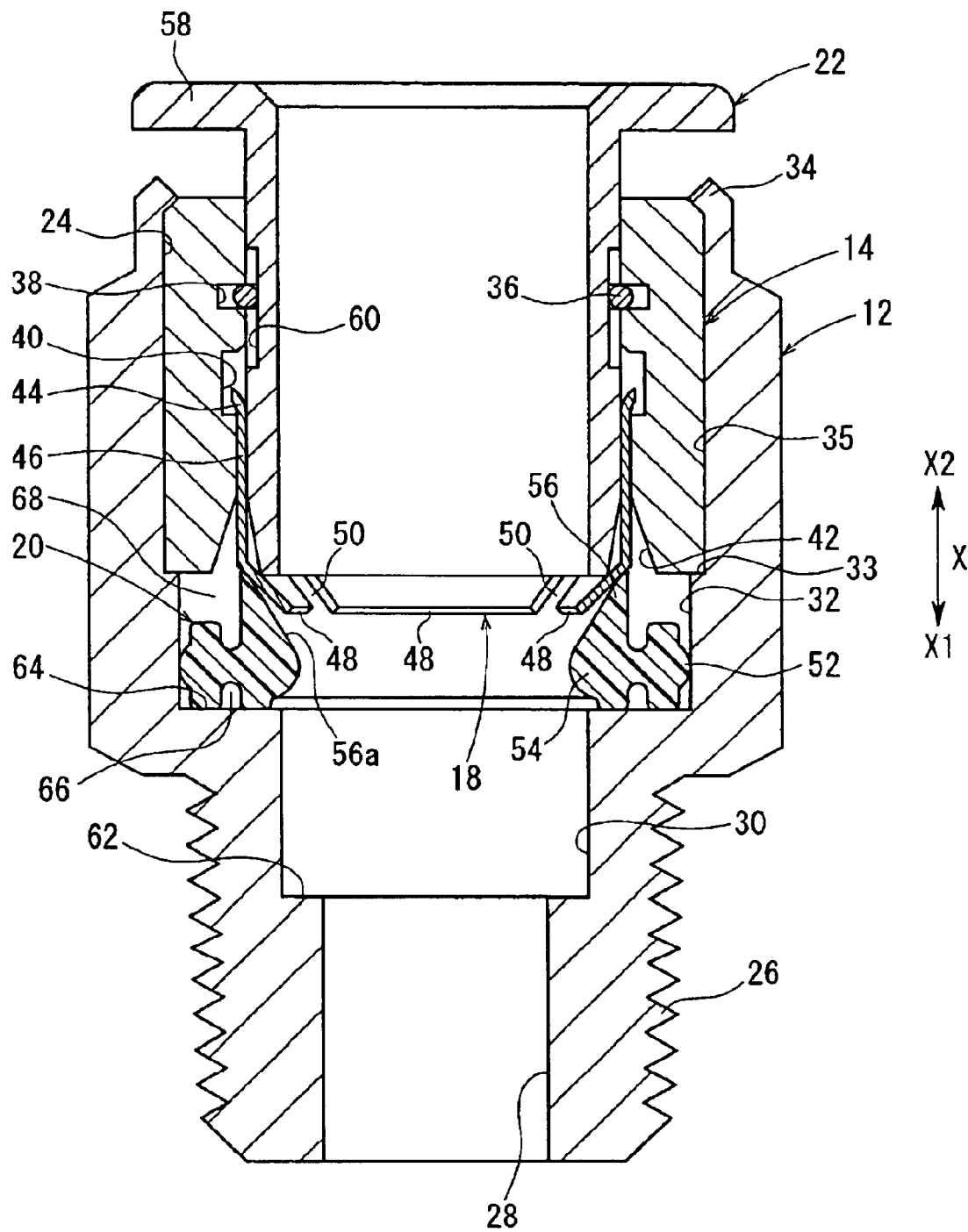
FIG. 1 is a vertical sectional view taking in the axial direction of a tube joint according to an embodiment of the present invention.

With reference to FIG. 1, reference numeral 10 indicates a tube joint according to an embodiment of the present invention.

The tube joint 10 comprises a body 12 which is composed of a metal material (for example, stainless steel such as SUS 316 according to Japanese Industrial Standard), a substantially cylindrical guide member 14 which is inserted into the body 12 from one end thereof, and a chuck (chuck member) 18 which is provided in the guide member 14 and which retains a tube (tube member) 16 (see FIG. 3) for flowing a pressure fluid. In the body 12, there are a packing (seal member) 20 which retains the air-tightness when the tube 16 is inserted into the body 12, and a release bush (release member) 22 which is inserted into the guide member 14 and which functions to disengage the tube 16 from the body 12.

The body 12 has a substantially cylindrical shape. The tube 16 (see FIG. 3), which is composed of a resin material, is inserted into an opening 24 at one end of the body 12.

On the other hand, a connecting section 26, which is connected to a port or the like of an unillustrated fluid-operated apparatus, is formed at the other end of the body 12. A passage 28, which is communicated with the interior of the body 12 and through which the pressure fluid flows, is formed at a substantially central portion of the connecting section 26.

In the body 12, a first diametrally expanded hole 30, a second diametrally expanded hole 32, a step section 33 and a third diametrally expanded hole 35 are formed in this order from the passage 28 toward the opening 24. The first diametrally expanded hole 30 has an inner diameter which is diametrally expanded outwardly in the radial direction as compared with the passage 28. The second diametrally expanded hole 32, which is disposed adjacently to the first diametrally expanded hole 30, has an inner diameter which is further diametrally expanded outwardly in the radial direction as compared with the first diametrally expanded hole 30.

The cylindrical guide member 14 is forcibly inserted from the opening 24 into the third diametrally expanded hole 35. When the end of the guide member 14 abuts against the step section 33 of the third diametrally expanded hole 35, the guide member 14 is positioned in the axial direction. That is, the guide member 14, which is composed of a metal material, has an outer circumferential diameter which is formed to be slightly larger than an inner circumferential diameter of the third diametrally expanded hole 35 of the body 12. Thus, the guide member 14 is forcibly inserted into the body 12 in a favorable manner.

One end of the body 12 is bent and crimped inwardly in the radial direction by the aid of an unillustrated crimping means while the guide member 14 is forcibly inserted, and thus a crimped section 34 is formed (see FIG. 1). Accordingly, the crimped section 34 prevents the guide member 14 from being disengaged through the opening 24 to the outside of the body 12.

In this description, the guide member 14 is forcibly inserted into the body 12, and fixed by the crimped section 34. However, there is no limitation thereto. The guide member 14 may be fixed to the body 12 by forcibly inserting the guide member 14 into the third diametrally expanded hole 35, and/or by fixing by the crimped section 34.

Figure 2:
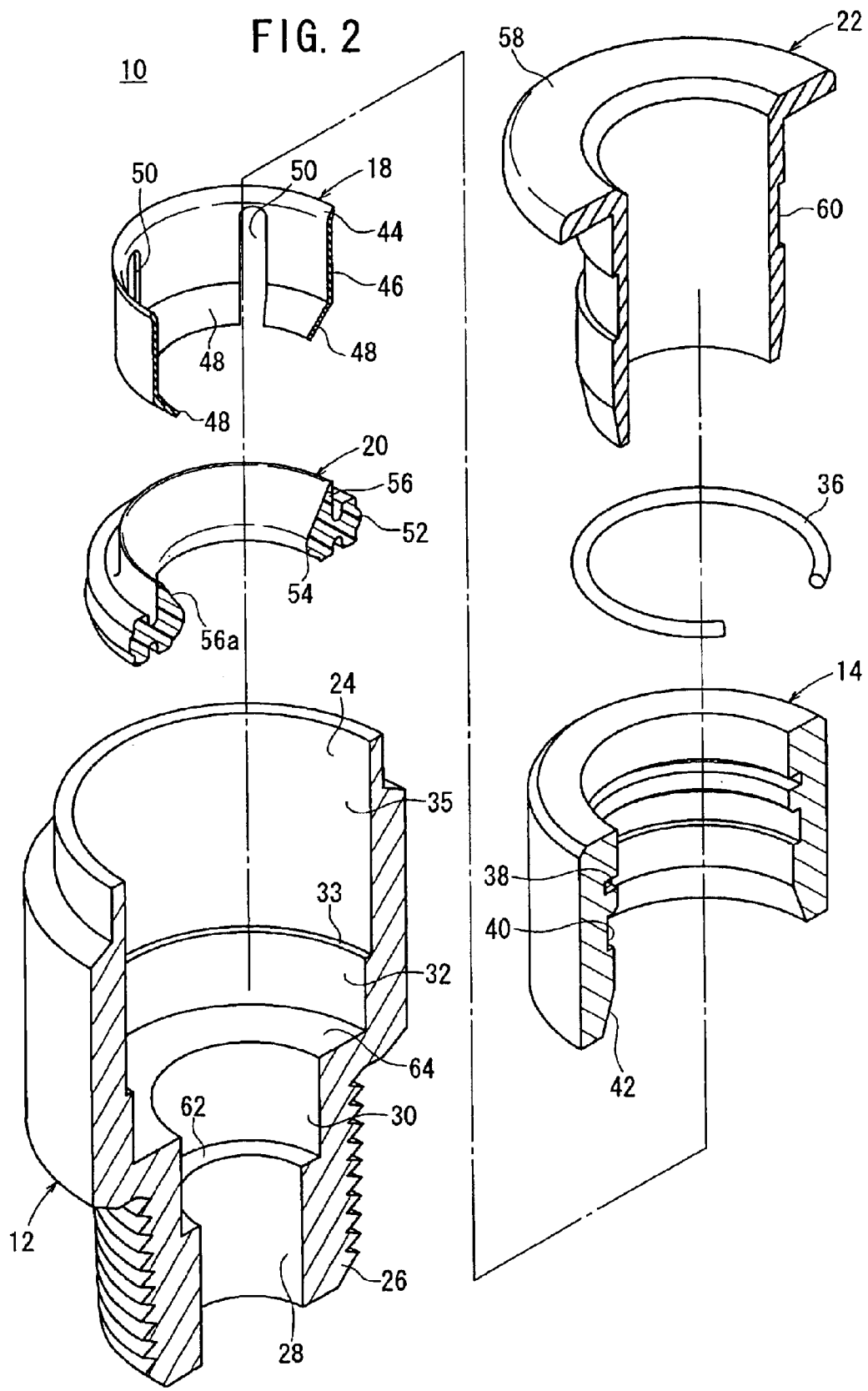
FIG. 2 is an exploded perspective sectional view illustrating the tube joint shown in FIG. 1.

Outer circumferential surface portions of the guide member 14 are formed to have a substantially identical diameter. The outer circumferential surface of the guide member 14 abuts against the inner circumferential surface of the third diametrally expanded hole 35 of the body 12. An engaging groove (first annular groove) 38, which is separated by a predetermined distance from one end of the body 12 at the crimped section 34, is formed on the inner circumferential surface of the guide member 14. A substantially C-shaped ring member (fastening member) 36 is engaged with the engaging groove 38. As shown in FIG. 2, the ring member 36 is composed of a non-annular member such that a part of an annular member is cut out and one end and the other end in the circumferential direction are separated from each other by a predetermined distance. The ring member 36 is made of a metal material, and thus it has elasticity to be diametrally expandable and diametrally shrinkable.

On the other hand, a chuck groove (groove section) 40, which is recessed outwardly in the radial direction, is formed at a position on the other end in the axial direction as compared with the engaging groove 38, is formed on the inner circumferential surface of the guide member 14. The chuck groove 40 is formed to extend by a predetermined length in the axial direction of the guide member 14. The end of the chuck 18 is engaged with the chuck groove 40.

A guide surface (guiding surface) 42, which has an inner circumferential surface diametrally expanded gradually toward the end, is formed at the other end of the guide member 14.

The chuck 18 is formed of a pressed thin plate material. The chuck 18 is installed between the inner circumferential surface of the guide member 14 and the outer circumferential surface of the release bush 22. The chuck 18 comprises an engaging section 44 which is formed in a diametrally expanded manner outwardly in the radial direction at one end, cylindrical sections 46 each of which is formed to have substantially the same diameter as the inner circumferential diameter of the guide member 14 between one end and the other end of the chuck 18, and fastening pawls 48 each of which is inclined by a predetermined angle toward the connecting section 26 on the other end side and each of which protrudes to be diametrally shrunk.

The engaging section 44 is engaged into the chuck groove 40 of the guide member 14. The chuck 18 is provided displaceably by a predetermined distance in the direction of the arrow X along the chuck groove 40 under the engaging action of the engaging section 44 with respect to the chuck groove 40. That is, the chuck 18 is provided between the inner circumferential surface of the guide member 14 and the outer circumferential surface of the release bush 22, and the engaging section 44 is engaged with the chuck groove 40. Therefore, the chuck 18 is not disengaged from the inside of the body 12.

As shown in FIGS. 1 and 2, the chuck 18 is formed with a plurality of (for example, four) slits 50 which extend in the direction of the arrow X and which are separated from each other by substantially equal angles in the circumferential direction. The fastening pawls 48, which are formed at the other end, are formed to be diametrally expandable and diametrally shrinkable with respect to the cylindrical sections 46 which are formed in the annular form.

The packing 20 is internally installed on the side of the connecting section 26 of the body 12 in the second diametrally expanded hole 32 of the body 12. The packing 20 comprises an outer diametral end seal section 52 having a semicircular cross section which is formed on the outer circumferential side of the packing 20, which contacts the inner circumferential surface of the second diametrally expanded hole 32, and which functions as a first seal section S1, and an inner diametral end seal section 54 which contacts the outer circumferential surface of the tube 16 when the tube 16 is inserted and which functions as a second seal section S2. The packing 20 is provided displaceably along the inner circumferential surface of the second diametrally expanded hole 32 by the aid of the outer diametral end seal section 52. The outer diametral end seal section 52 is formed to have a shape of annular projection.

A pressing section 56 is formed on the inner diametral end seal section 54 on the side of the chuck 18. An inclined surface 56*a*, which is deformable to have substantially the same angle as the angle of inclination of the fastening pawl 48 of the chuck 18, is formed on the pressing section 56. In other words, the inclined surface 56*a* is formed to be opposed to the outer circumferential surface of the fastening pawls 48.

The release bush 22 has its one end which is inserted into the guide member 14. One end of the release bush 22 is formed to have a tapered shape with its outer circumferential surface being diametrally shrunk inwardly in the radial direction in a gradual manner. A flange section 58, which is diametrally expanded outwardly in the radial direction, is formed at the other end of the release bush 22. An annular groove (second annular groove) 60, which is recessed inwardly in the radial direction, is formed at a substantially central portion along the axis of the release bush 22. The ring member 36, which is formed in the engaging groove 38 of the guide member 14, is engaged with the annular groove 60 when the release bush 22 is inserted into the guide member 14. The annular groove 60 is formed to extend by a predetermined length in the axial direction (direction of the arrow X) of the release bush 22.

That is, the release bush 22 is provided displaceably in the axial direction (direction of the arrow X) by the predetermined length of the annular groove 60 engaged with the ring member 36.

Figure 6:
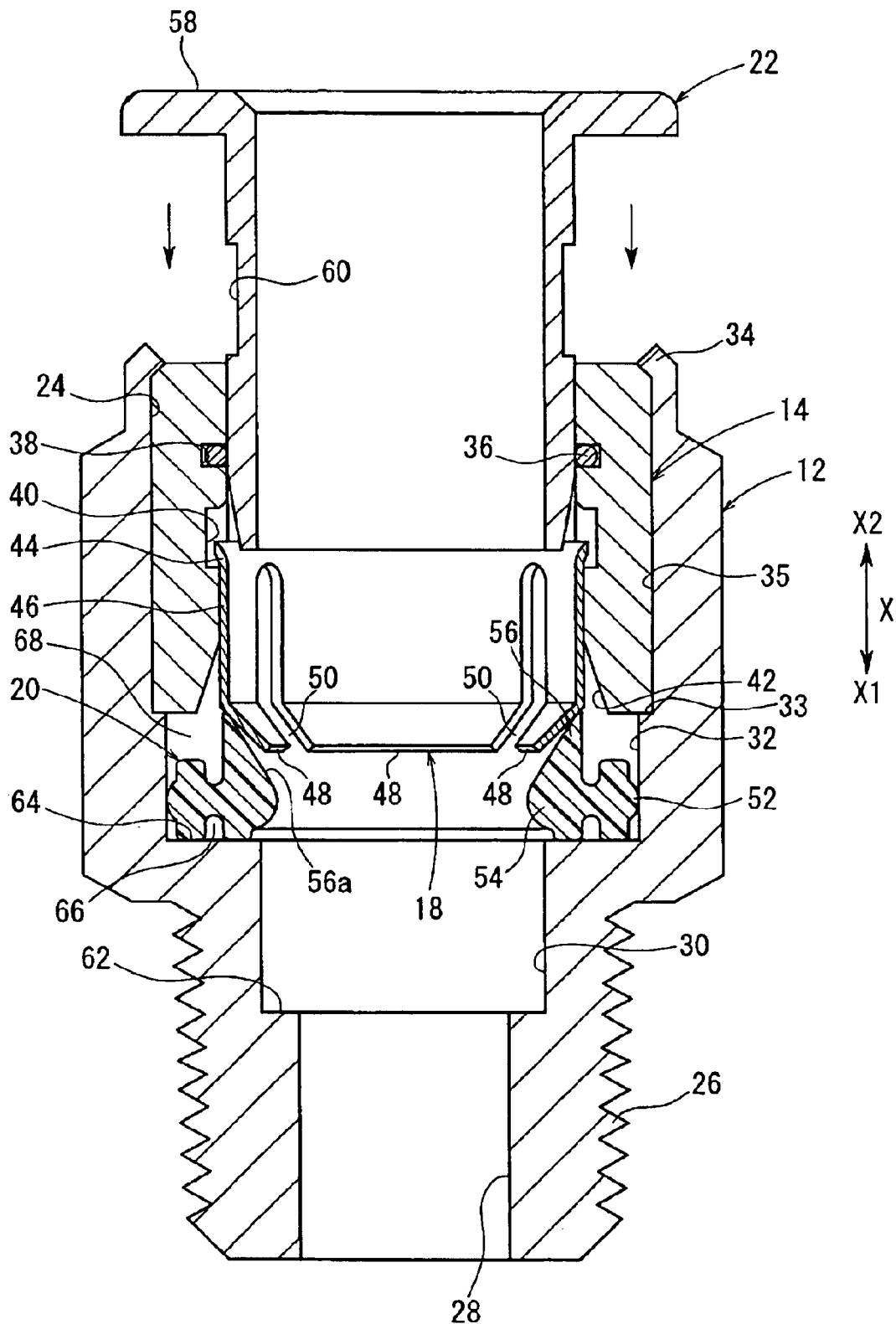
FIG. 6 is a vertical sectional view to explain the assembling when the release bush is inserted into and assembled to the tube joint shown in FIG. 1.

The tube joint 10 according to the embodiment of the present invention is basically constructed as described above. Next, its operation, function, and effect will be explained. First, as shown in FIG. 6, an explanation will be made about a procedure to assemble the release bush 22 into the body 12.

One end of the release bush 22 is displaced in the direction of the arrow X1 to insert the release bush 22 into the guide member 14 while the ring member 36 is installed to the engaging groove 38 of the guide member 14. One end of the release bush 22 is formed to have the tapered shape with its outer circumference configuration being diametrally shrunk gradually toward the connecting section 26. Therefore, when the one end passes through the inside of the ring member 36, the ring member 36, which is formed of the metal material having the elasticity to be diametrally expandable and diametrally shrinkable, is diametrally expandable outwardly in the radial direction in a gradual manner.

When the release bush 22 is further inserted into the body 12 in the direction of the arrow X1 to arrive at the position at which the annular groove 60 of the release bush 22 faces the ring member 36, then the ring member 36, which has been diametrally expanded outwardly in the radial direction by the outer circumferential surface of the release bush 22, is diametrally shrunk under the elastic action thereof, and the ring member 36 is fitted into the annular groove 60.

As a result, the ring member 36 is engaged with both of the engaging groove 38 of the guide member 14 and the annular groove 60 of the release bush 22. In this state, the release bush 22 is engaged with the guide member 14 to limit the displacement in the axial direction (direction of the arrow X).

That is, when the release bush 22 is inserted, then the ring member 36 is diametrally expanded slightly, and it is favorably accommodated in the engaging groove 38 (see FIG. 6). Therefore, no trouble occurs when the release bush 22 is inserted into the guide member 14. Further, upon the arrival at the position at which the annular groove 60 of the release bush 22 faces the ring member 36, the ring member 36 is diametrally shrunk inwardly in the radial direction under the elastic action, and is fitted into the annular groove 60.

Therefore, the release bush 22 is prevented from the disengagement from the guide member 14 under the engaging action effected by the ring member 36. Further, the release bush 22 can be simply engaged with the guide member 14 by the aid of the ring member 36.

As a result, it is unnecessary to provide any slit in the release bush 22, for temporarily shrinking the end of the release bush 22 diametrally when the release bush 22 is inserted into the guide member 14. Therefore, it is unnecessary to provide the production step of forming the slit in the release bush 22. Therefore, it is possible to reduce the production steps. Further, when the slit is unnecessary, it is possible to improve the rigidity and the strength of the release bush 22.

The release bush 22 is engaged while the release bush 22 is displaceable along the axial direction (direction of the arrow X) of the annular groove 60 of the release bush 22.

Next, an explanation will be made about the operation, function, and effect of the tube joint 10 to which the release bush 22 has been integrally assembled as described above.

Figure 3:
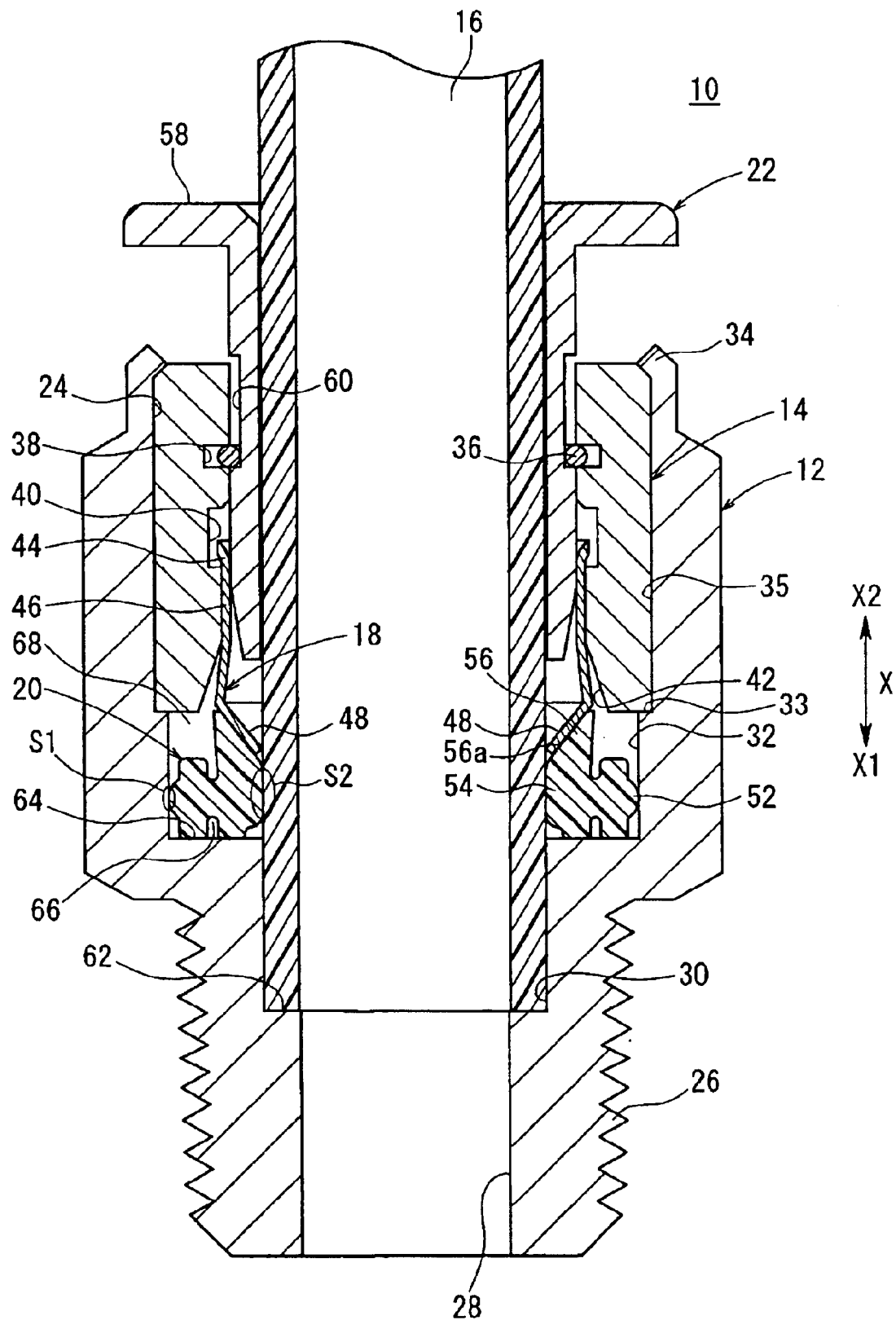
FIG. 3 is a vertical sectional view showing that a tube is inserted into the tube joint shown in FIG. 1.

First, starting from the state (see FIG. 1) in which the tube 16 is not installed to the tube joint 10, the tube 16 is inserted into the body 12 (in the direction of the arrow X1) from the end of the flange section 58 of the release bush 22 as shown in FIG. 3. One end surface of the tube 16 abuts against the end surface 62 of the first diametrally expanded hole 30.

In this process, the inner diametral end seal section 54 of the packing 20 contacts the outer circumferential surface of the tube 16 to surround the tube 16. Accordingly, the second seal section S2 is provided. Further, the air-tightness is retained in the body 12 under the cooperating action with the first seal section S1 at which the outer diametral end seal section 52 of the packing 20 contacts the inner circumferential surface of the body 12. When the pressure fluid flows through the tube 16, the pressure fluid is prevented from any leakage to the outside.

The fastening pawls 48 of the chuck 18 are forcibly lifted outwardly in the radial direction by the outer circumferential surface of the tube 16 and diametrally expanded. In this state, the ends of the fastening pawls 48 contact the outer circumferential surface of the tube 16. In this situation, the pressure fluid is not supplied via the tube 16, and pressure is not applied. However, the fastening pawls 48 of the chuck 18 grip the outer circumferential surface of the tube 16 faintly by the elasticity thereof.

When the tube 16 is inserted into the body 12, the packing 20 is pressed in the direction (direction of the arrow X1) toward the connecting section 26, and the packing 20 is displaced to abut against the end surface 64 of the second diametrally expanded hole 32. Similarly, the chuck 18 is pressed by the tube 16 toward the connecting section 26 (in the direction of the arrow X1), and the outer circumferential surfaces of the fastening pawls 48 abut against the pressing section 56 of the packing 20.

That is, the pressure in the passage 28 is the same as the pressure in the first space section 66 disposed at the lower portion of the packing 20 which is sealed by the first and second seal sections S1, S2. On the other hand, the second space section 68, which is disposed at the upper portion of the packing 20 sealed by the first and second seal sections S1, S2, has the atmospheric pressure. Therefore, the packing 20 is displaced in the direction toward the opening 24 of the body 12 (in the direction of the arrow X2) along the inner circumferential surface of the second diametrally expanded hole 32 by the outer diametral end seal section 52 on the basis of the difference in pressure between the first space section 66 and the second space section 68. Accordingly, the inclined surface 56a of the pressing section 56 of the packing 20 abuts against the fastening pawls 48 of the chuck 18.

Figure 4:
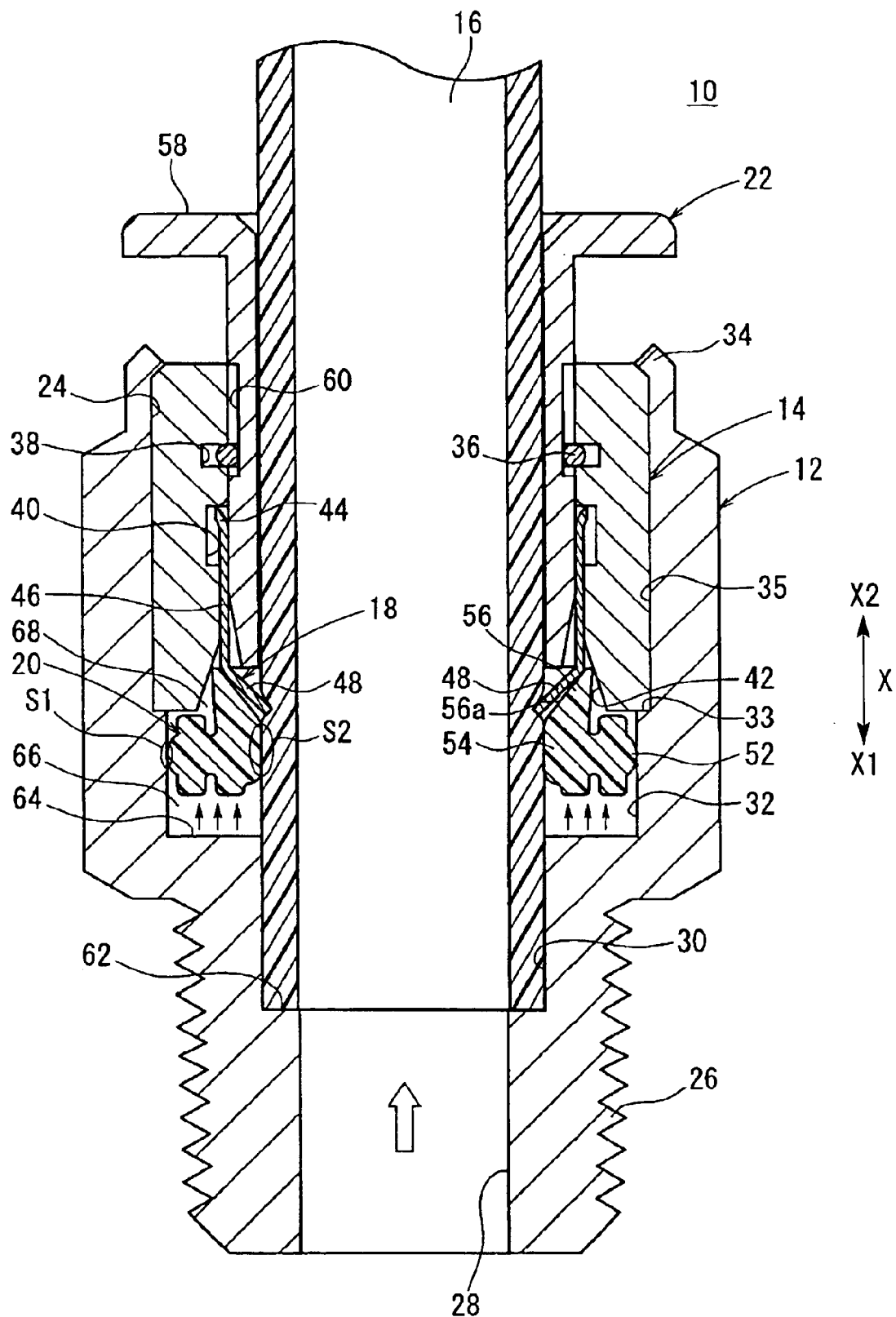
FIG. 4 is a vertical sectional view showing that a pressure fluid is supplied into a tube to be connected to the tube joint shown in FIG. 3.

As shown in FIG. 4, when the pressure fluid is supplied to the passage 28 via the connecting section 26 which is connected to the port of the unillustrated fluid-operated apparatus, the chuck 18 is further pressed in the direction of the arrow X2 by the packing 20 which abuts against the fastening pawls 48 of the chuck 18. The fastening pawls 48, which have been diametrally expanded outwardly in the radial direction by the outer circumferential surface of the tube 16, are forcibly shrunk inwardly in the radial direction gradually by the guide surface 42 of the guide member 14. As a result, the fastening pawls 48 bite into the outer circumferential surface of the tube 16.

The fastening pawls 48 of the chuck 18 grip the outer circumferential surface of the tube 16 faintly by the elasticity even when the pressure fluid is not supplied to the interior of the body 12 via the tube 16. Therefore, when the tube 16 is pulled in the direction (direction of the arrow X2) to separate from the body 12, it is possible to have the fastening pawls 48 bite into the outer circumferential surface of the tube 16 to effect the fastening.

Figure 5:
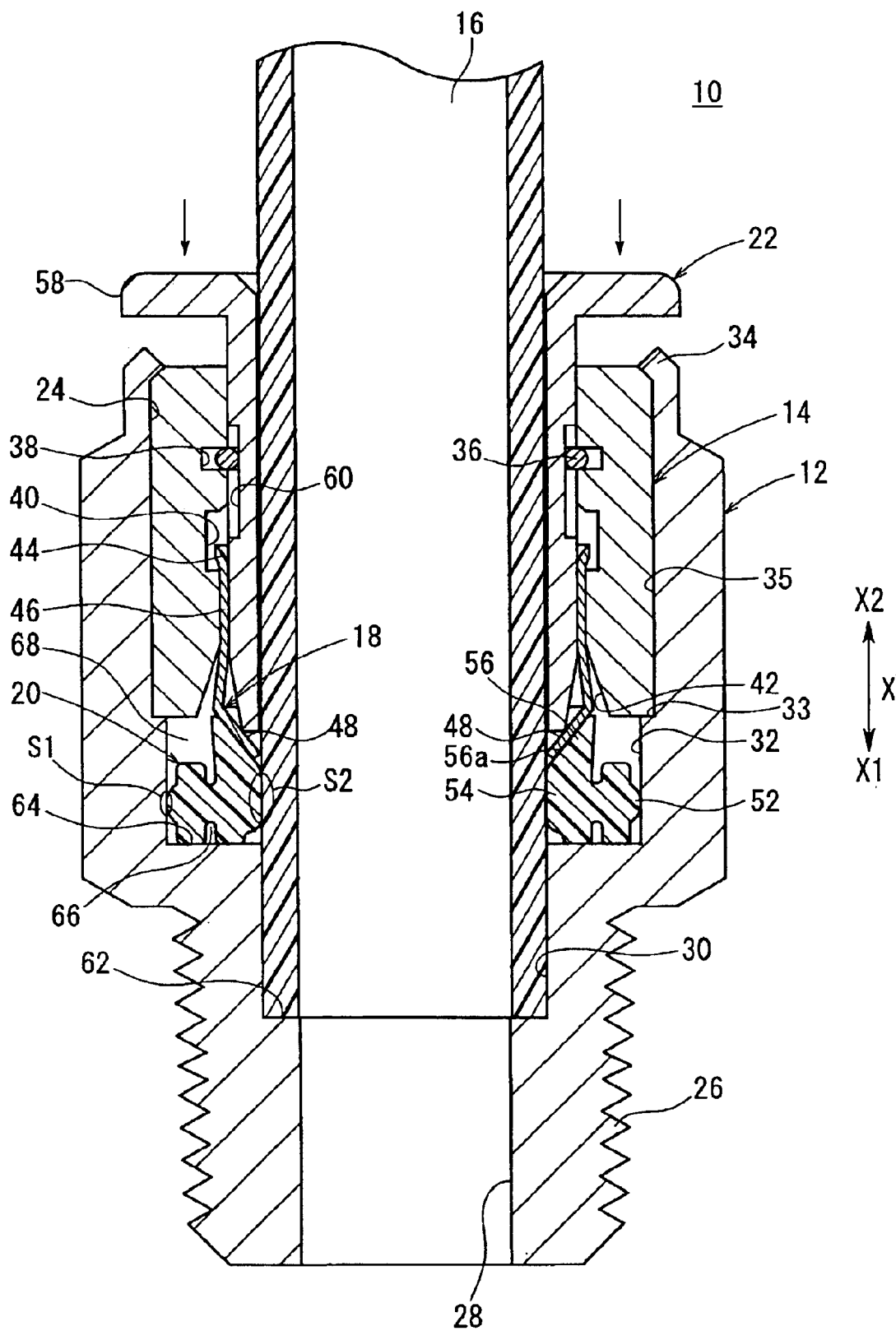
FIG. 5 is a vertical sectional view showing that the release bush is pressed when the tube is disengaged from the tube joint shown in FIG. 3.

On the other hand, when the tube 16 is reversely disengaged from the tube joint 10, the flange section 58 of the release bush 22 is depressed in the direction toward the body 12 (in the direction of the arrow X1) as shown in FIG. 5. One end of the release bush 22 presses the fastening pawls 48 and the packing 20 toward the connecting section 26 (in the direction of the arrow X1) under the pressing action of the flange section 58. Accordingly, the fastening pawls 48, which have been diametrally shrunk inwardly in the radial direction forcibly by the guide member 14, are diametrally expanded outwardly in the radial direction in accordance with the repulsive force. The fastening pawls 48, which have bitten into the outer circumferential surface of the tube 16, are separated from the outer circumferential surface of the tube 16.

As a result, the tube 16 is released from the fastened state. Therefore, when the tube 16 is pulled in the direction (direction of the arrow X2) to separate from the body 12, the tube 16 can be disengaged from the tube joint 10.

As described above, in the embodiment of the present invention, the substantially C-shaped ring member 36 is engaged with the engaging groove 38 formed on the inner circumferential surface of the guide member 14. When the release bush 22 is inserted into the guide member 14, the ring member 36, which has been engaged with the engaging groove 38, is engaged with the annular groove 60 of the release bush 22.

Accordingly, when the release bush 22 is installed into the guide member 14, the ring member 36 engaged with the engaging groove 38 is diametrally extendable and diametrally shrinkable in the radial direction, and the ring member 36 is received in the engaging groove 38 under the pressing action brought about by the release bush 22. Thus, no trouble occurs when the release bush 22 is inserted.

Upon the arrival at the position at which the annular groove 60 of the release bush 22 faces the ring member 36, the ring member 36 is diametrally shrunk inwardly in the radial direction under the elastic action thereof, and is inserted into the annular groove 60.

As a result, the ring member 36 is engaged with the engaging groove 38 and the annular groove 60, and thus the release bush 22 can be engaged preferably and conveniently with respect to the guide member 14 installed into the body 12. Thus, the release bush 22 is prevented from any disengagement from the guide member 14.

The guide member 14, which has the tapered guide surface 42, is installed into the body 12. Further, the packing 20 is provided, which is displaceable toward the opening 24 of the body 12 under the action of the pressure fluid to be supplied into the body 12. Accordingly, the packing 20 is displaced toward the opening 24 by the pressure fluid, and the chuck 18 is pressed toward the opening 24 by the pressing section 56 to move integrally.

Therefore, the fastening pawls 48 are diametrally shrunk inwardly in the radial direction forcibly in the gradual manner by the guide surface 42 of the guide member 14 under the displacement action of the chuck 18, and the fastening pawls 48 bite into the outer circumferential surface of the tube 16. As a result, the packing 20 is displaced by the pressure fluid flowing through the interior of the tube joint 10, and the fastening pawls 48 of the chuck 18 are diametrally shrunk by the guide member 14 to allow the fastening pawls 48 to bite into the tube 16. Thus, it is possible to reliably fasten the tube 16 with respect to the tube joint 10.

That is, it is unnecessary to use any collet which has been hitherto provided to allow the fastening pawls 48 of the chuck 18 to bite into the outer circumferential surface of the tube 16. Thus, it is possible to reduce the number of parts. In other words, the guide member 14 has both functions of the conventional guide member and the conventional collet, and thus it is possible to reduce the number of parts.

Further, all of the constituent parts of the tube joint 10 other than the packing 20 are formed of the metal materials (for example, stainless steel such as SUS 316 according to Japanese Industrial Standard). Accordingly, it is possible to improve the entire strength of the tube joint 10.

Figure 7:
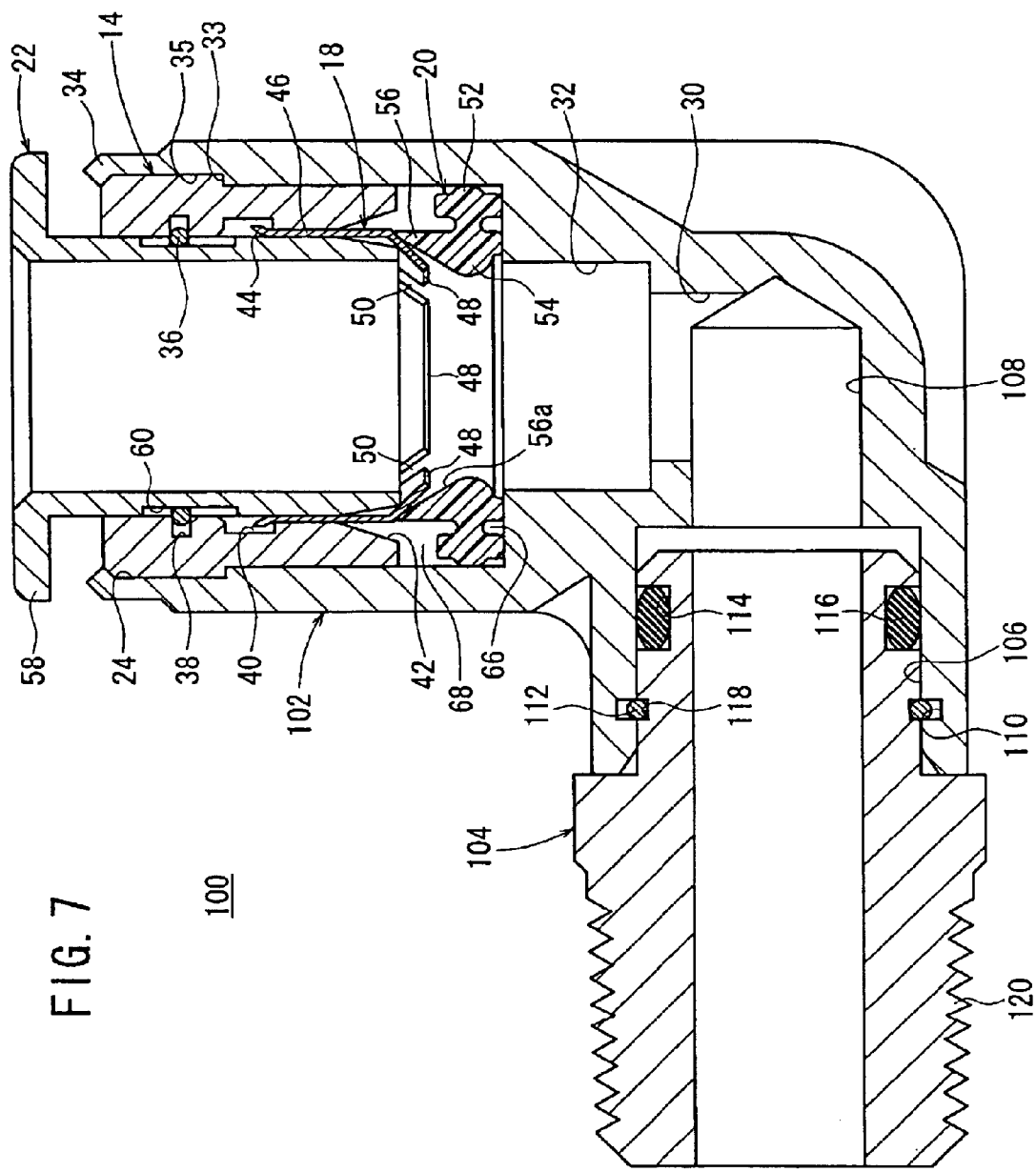
FIG. 7 is a vertical sectional view illustrating a tube joint according to another embodiment.

Next, a tube joint 100 according to another embodiment of the present invention is shown in FIG. 7. In the embodiment described below, the constituent elements same as those of the tube joint 10 according to the embodiment described above will be designated by the same reference numerals, and any detailed explanation thereof will be omitted.

The tube joint 100 according to this another embodiment is different from the tube joint 10 according to the embodiment of the present invention as described above in that a body 102 is formed of a metal material in a bent form to have a substantially L-shaped cross section. An unillustrated tube is connected to one end of the body 102, and a joint member 104, to which a port of an unillustrated fluid-operated apparatus or the like is connected, is installed to the other end of the body 102.

An installation hole 106, to which the joint member 104 is installed, is formed at the other end of the body 102. The installation hole 106 communicates with the first diametrally expanded hole 30 via a communication passage 108.

An engaging groove 110 is formed in the installation hole 106 of the body 102, to which a substantially C-shaped ring member 112 is engaged. As shown in FIG. 2, the ring member 112 is composed of a non-annular member formed such that a part of an annular member is cut out so that one end and the other end in the circumferential direction are separated from each other by a predetermined distance. The ring member 112 is made of a metal material, and thus it has elasticity to be diametrally expandable and diametrally shrinkable.

A seal member 116 is installed to a groove section 114 formed on the outer circumferential surface on one end of the joint member 104 to be inserted into the installation hole 106. The air-tightness is retained in the body 102 and the joint member 104 by means of the seal member 116.

An annular groove 118 is formed and separated from the groove section 114 by a predetermined distance in the axial direction. The ring member 112, which is engaged with the groove section 114, is engaged with the annular groove 118 when one end of the joint member 104 is inserted into the installation hole 106 of the body 102.

A connecting section 120 is formed at the other end of the joint member 104, and has a thread formed on the outer circumferential surface of the other end. The connecting section 120 is connected to the port of the unillustrated fluid-operated apparatus or the like.

That is, when one end of the joint member 104 is inserted into the installation hole 106 of the body 102, the ring member 112 is diametrally expanded outwardly in the radial direction under the pressing action effected by the joint member 104, and is favorably accommodated in the engaging groove 110. Therefore, no trouble occurs when the joint member 104 is inserted.

Upon arrival at the position at which the annular groove 118 of the joint member 104 faces the ring member 112, the ring member 112 is diametrally shrunk inwardly in the radial direction under the elastic action, and is inserted into the annular groove 118.

As a result, the ring member 112, which has been engaged with the installation hole 106 of the body 102, is engaged with the annular groove 118 upon the insertion into the installation hole 106 of the joint member 104. Thus, it is possible to connect the body 102 and the joint member 104 simply and reliably.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A tube joint comprising:
 a body made of metal which has an opening for inserting a tube member thereinto and which is formed with a passage for flowing a pressure fluid;

a cylindrical guide member internally fitted into said opening of said body, said guide member having a guide surface and a first annular groove formed on an inner wall thereof;

a release member which is inserted displaceably in an axial direction into a hole of said guide member and which has a second annular groove formed on an outer wall thereof;

a chuck member which is provided displaceably along said inner wall of said guide member and which is formed with pawls to bite into an outer circumferential surface of said tube member in order to fasten said tube member;

a seal member which is provided displaceably along an inner wall of said body, which contacts said inner wall of said body so that a first seal section is formed, and which surrounds and contacts said outer circumferential surface of said tube member so that a second seal section is formed; and a fastening member which is provided to engage with said first annular groove of said guide member and said second annular groove of said release member and which prevents said release member from being disengaged from said hole of said guide member, wherein said chuck member is displaced together with said seal member along said inner wall of said guide member by said pressure fluid supplied into said passage, and thus said pawls are shrunk inwardly in a radial direction to fasten said tube member.

2. The tube joint according to claim 1, wherein said fastening member comprises a C-shaped ring member which has elasticity and which is diametrally expandable and diametrally shrinkable.

3. The tube joint according to claim 1, wherein a crimped section, which holds said guide member, is formed at an end of said body for forming said opening.

4. The tube joint according to claim 1, wherein said first seal section of said seal member comprises an outer diametral end seal section which protrudes toward said inner wall of said body.

5. The tube joint according to claim 1, wherein said second seal section of said seal member comprises an inner diametral end seal section which protrudes toward said outer circumferential surface of said tube member inserted into said body.

6. The tube joint according to claim 1, wherein said seal member is formed with a pressing section which has an inclined surface inclined to be substantially parallel to said pawls of said chuck member.

7. The tube joint according to claim 6, wherein when said seal member is displaced in a direction to approach said chuck member by said pressure fluid supplied to said passage of said body, said pressing section of said seal member is displaced while being shrunk inwardly in said radial direction by said guide surface of said guide member.

8. The tube joint according to claim 6, wherein said pawls of said chuck member are pressed by said pressing section of said seal member toward said outer circumferential surface of said tube member when said pressure fluid is supplied to said passage of said body.

9. The tube joint according to claim 1, wherein one end of said chuck member is engaged displaceably in said axial direction with a groove which is formed on said inner wall of said guide member.

10. The tube joint according to claim 1, wherein said seal member is displaceable in a direction to approach said chuck member when pressed by said pressure fluid supplied into said passage.

11. The tube joint according to claim 1, wherein said seal member is pressed by said release member to be displaced in a direction to separate from said chuck member when said release member is inserted into said body.

12. The tube joint according to claim 1, wherein said chuck member has said pawls which bite into said outer circumferential surface of said tube member by pulling said tube member in a direction to disengage from said body while said tube member is inserted into said body.

13. The tube joint according to claim 1, wherein said guide surface of said guide member is tapered so that said guide surface is diametrally expanded gradually toward said seal member.

* * * * *